United States Patent
Prasad et al.

(10) Patent No.: US 10,379,830 B2
(45) Date of Patent: Aug. 13, 2019

(54) CONTEXT-BASED ANALYTICAL ENGINE FOR EXTENDING APPLICATION FUNCTIONALITY

(71) Applicant: Oracle International Corporation, Redwood Shores, CA (US)

(72) Inventors: Kyasaram Vishwa Prasad, Hyderabad (IN); Anilkumar Gande, Hyderabad (IN); Roya Lashgari Afshar, San Carlos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 238 days.

(21) Appl. No.: 15/258,401

(22) Filed: Sep. 7, 2016

(65) Prior Publication Data

US 2018/0067734 A1  Mar. 8, 2018

(51) Int. Cl.
*G06F 8/61* (2018.01)
*G06F 11/30* (2006.01)
*G06F 11/34* (2006.01)

(52) U.S. Cl.
CPC .............. *G06F 8/61* (2013.01); *G06F 11/302* (2013.01); *G06F 11/3495* (2013.01)

(58) Field of Classification Search
None
See application file for complete search history.

(56) References Cited

U.S. PATENT DOCUMENTS

| | | | |
|---|---|---|---|
| 9,111,219 B1 * | 8/2015 | Mohla | G06N 5/02 |
| 9,230,276 B2 | 1/2016 | Mehta et al. | |
| 10,051,103 B1 * | 8/2018 | Gordon | G06F 21/36 |
| 2002/0198882 A1 * | 12/2002 | Linden | G06F 17/30867 |
| 2006/0001645 A1 * | 1/2006 | Drucker | G06F 3/017 |
| | | | 345/156 |
| 2007/0226654 A1 * | 9/2007 | Hwang | G06F 3/0482 |
| | | | 715/841 |
| 2010/0250337 A1 | 9/2010 | Kassaei | |

(Continued)

OTHER PUBLICATIONS

Chen A. (2005) Context-Aware Collaborative Filtering System: Predicting the User's Preference in the Ubiquitous Computing Environment. In: Strang T., Linnhoff-Popien C. (eds) Location- and Context-Awareness. LoCA 2005. Lecture Notes in Computer Science, vol. 3479. Springer, Berlin, Heidelberg.*

(Continued)

*Primary Examiner* — Wei Y Zhen
*Assistant Examiner* — Binh Luu
(74) *Attorney, Agent, or Firm* — Invoke

(57) ABSTRACT

Methodologies and systems are described herein whereby application functionality may be optimized and extended based on a contextual analysis of the features that are accessed within the application. In one or more embodiments, the contextual analysis includes (a) detecting that an end user of an application is using a particular feature of the application and (b) determining that a set of one or more third-party applications are configured for operations accessing data sets of the same type accessed by the particular feature. Responsive at least to the detecting and determining operations, the set of one or more third-party applications are presented to the user when the user is accessing the particular feature of the first application.

18 Claims, 8 Drawing Sheets

(56) References Cited

U.S. PATENT DOCUMENTS

| | | | |
|---|---|---|---|
| 2011/0320307 A1* | 12/2011 | Mehta | G06Q 30/0282 |
| | | | 705/26.7 |
| 2012/0042036 A1* | 2/2012 | Lau | G06F 8/61 |
| | | | 709/217 |
| 2012/0072283 A1 | 3/2012 | DeVore et al. | |
| 2012/0084292 A1* | 4/2012 | Liang | G06F 17/30899 |
| | | | 707/741 |
| 2013/0085886 A1 | 4/2013 | Satish et al. | |
| 2013/0132896 A1 | 5/2013 | Lee et al. | |
| 2013/0178241 A1* | 7/2013 | Duggirala | H04W 4/60 |
| | | | 455/550.1 |
| 2013/0268396 A1 | 10/2013 | Agevik et al. | |
| 2013/0297700 A1 | 11/2013 | Hayton et al. | |
| 2014/0229898 A1* | 8/2014 | Terwedo | G06F 3/04817 |
| | | | 715/835 |
| 2015/0095322 A1 | 4/2015 | Procopio et al. | |
| 2015/0135214 A1* | 5/2015 | Reisman | H04N 21/64322 |
| | | | 725/37 |
| 2017/0097816 A1* | 4/2017 | Joshi | G06F 8/61 |
| 2017/0185255 A1* | 6/2017 | Brunswig | G06F 3/0484 |
| 2017/0185599 A1* | 6/2017 | Glover | G06F 17/3053 |
| 2018/0032997 A1* | 2/2018 | Gordon | G06Q 20/3224 |
| 2018/0329691 A1* | 11/2018 | Totale | G06F 16/2246 |

OTHER PUBLICATIONS

W. Woerndl, C. Schueller and R. Wojtech, "A Hybrid Recommender System for Context-aware Recommendations of Mobile Applications," 2007 IEEE 23rd International Conference on Data Engineering Workshop, Istanbul, 2007, pp. 871-878. (Year: 2007).*

V. K. Seetharamu, S. Sathish, A. Kumar and K. Kumar, "A Generic Framework for Recommendations Based on User Data Aggregation," 2016 IEEE International Conference on Web Services (ICWS), San Francisco, CA, 2016, pp. 617-622. (Year: 2016).*

Baltrunas et al.,"Frappé: Understanding the Usage and Perception of Mobile App Recommendations In-The-Wild", May 12, 2015, 10 pages.

Davidsson et al., "Utilizing Implicit Feedback and Context to Recommend Mobile Applications from First Use", CaRR 2011, Feb. 13, 2011, pp. 19-22.

MIT Technology Review,"Facebook Offers Mobile App Recommendations", Available online at <https://www.technologyreview.com/s/428138/facebook-offers-mobile-app-recommendations/>, Jun. 8, 2012, pp. 1-20.

Ronen et al., "Selecting Content-Based Features for Collaborative Filtering Recommenders", RecSys'13, Oct. 12-16, 2013, 4 pages.

* cited by examiner

Sales Forecasts

Tasks
- Review Revenue Items

Create
- Create Opportunity
- Create Task
- Create Appointment

Overview

Currency: USD US Dollar

Forecasts | Analysis

Search | Saved Search | My Active Revenue Forecasts ▼

Forecast Name | Forecast Type | Status

Search

Search: Opportunities ▼

Opportunity Name

Advanced

Third-Party Applications Related to Sales Forecasting

Installed Apps

SalesClic — Risk management for the sales pipeline.

Not Yet Installed

GoodData Sales Analytics — Better analytics. More accurate forecasts. It's every sales organization's dream app.

Revegy Territory Planning & Management — Visually plan and execute your Territory Plan to drive optimal performance from your ac....

FIG. 6A

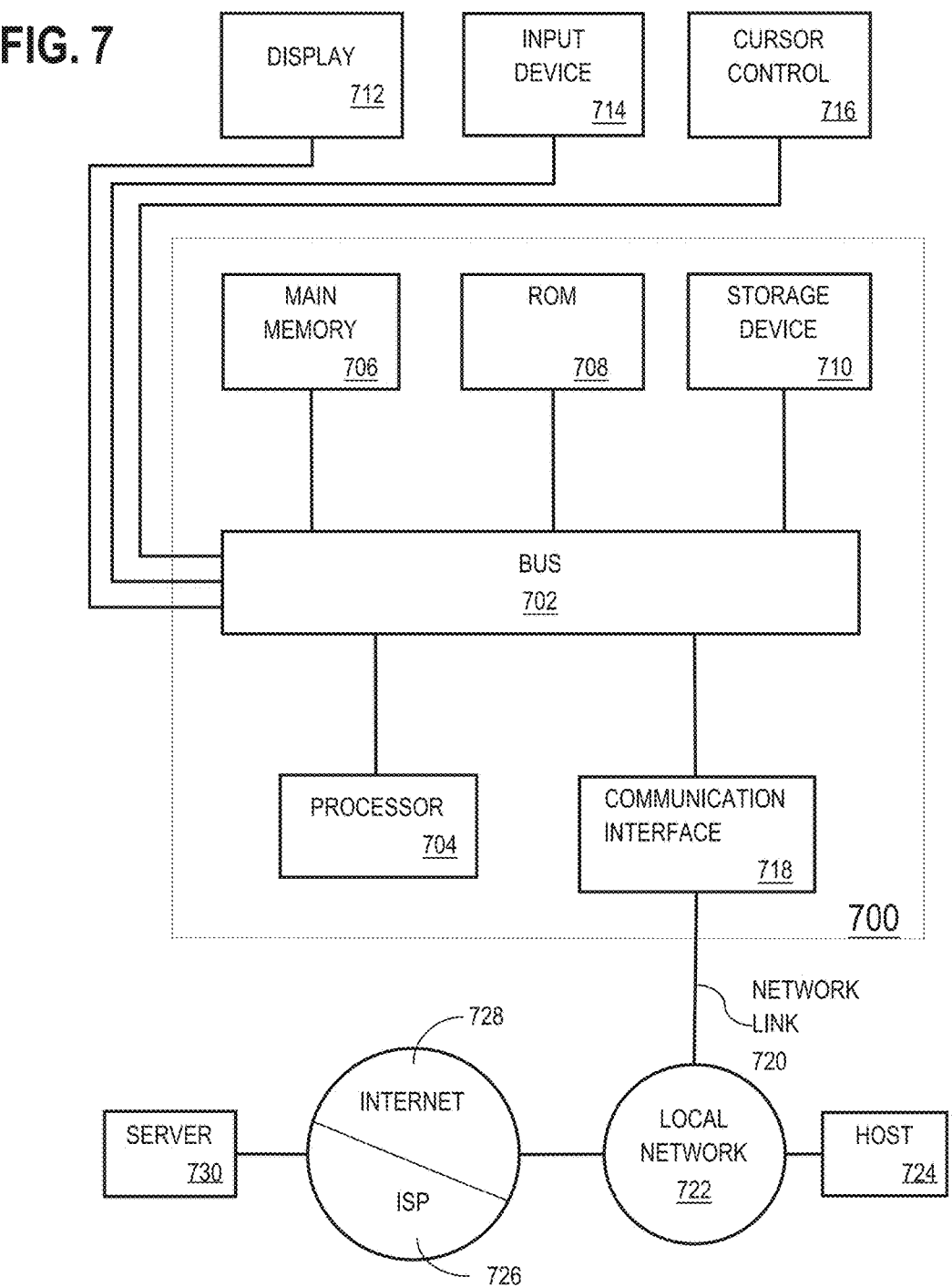

CONTEXT-BASED ANALYTICAL ENGINE FOR EXTENDING APPLICATION FUNCTIONALITY

TECHNICAL FIELD

The present disclosure relates, generally, to context-based analytics for extending application functionality. In particular, the present disclosure relates to presenting and providing access to applications that extend the functionality of a separate application being used by a user.

BACKGROUND

Third-party applications, as referred to herein, are software components designed to extend the functionality of software applications being used by a user. In many cases, third-party applications are published or otherwise made available through an app store or some other online distribution platform. Users connected to the online distribution platform may search for third-party applications of interest. If a user finds a particular third-party application, then the user may initiate a transaction with the online distribution platform to download and integrate the application with another compatible software application.

Online distribution platforms such as app stores facilitate the connection between third-party developers and end users. Third-party developers are able to publish plugins, add-ons, and other extensions to enable end users to search for and add new features to software systems from different providers. However, end users generally need to be proactive about finding third-party applications of interest. If an additional feature is desired, the end user typically must connect to the online distribution channel through a browser or separate application. Once connected, the user may be required to search for third-party applications from a cluttered list of applications, which is time-consuming and cumbersome. In other cases, end users of a software system may not even be aware of existing third-party applications that are compatible. The end users may thus fail to take advantage of third-party applications that optimize performance of the software system.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 6A illustrates an example interface that includes presentation of third-party applications within the context of a forecasting feature concurrently accessed by an end user, in accordance with one or more embodiments;

FIG. 7 illustrate an example computer system on which one or more embodiments may be implemented.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. ARCHITECTURAL OVERVIEW
3. CONTEXT-BASED PRESENTATIONS
4. CONTEXT-BASED TRAINING
5. CONTEXT-BASED CLOUD ANALYTICS
6. EXAMPLE PRESENTATION INTERFACE
7. HARDWARE OVERVIEW
8. MISCELLANEOUS; EXTENSIONS

1. General Overview

Methodologies and systems are described herein whereby application functionality may be optimized and extended based on a contextual analysis of the features that are accessed by a user of the application. In one or more embodiments, the contextual analysis includes (a) detecting that an end user of an initial application is using a particular feature of the initial application and (b) determining that a set of one or more third-party applications are configured for operations accessing data sets of the same type accessed by the particular feature. Responsive at least to the detecting and determining, a presentation engine causes the set of one or more third-party applications to be presented to the user. The presentation engine may present the set of third-party applications when the user is accessing the particular feature of the initial application or subsequent to the user accessing the particular feature of the initial application.

Methodologies and systems are also described herein whereby application functionality may be optimized based on analytics performed with respect to a plurality of users of an initial application. In one or more embodiments, a training logic detects that a first user is accessing (a) a particular feature of the initial application and (b) a third-party application accessing at least one data set accessed by the particular feature of the initial application. The training logic further detects that a second user is accessing the particular feature of the first application. Responsive at least to the detecting, a presentation engine causes the third-party application to the second user when accessing the particular feature of the application.

2. Architectural Overview

Figure 1:
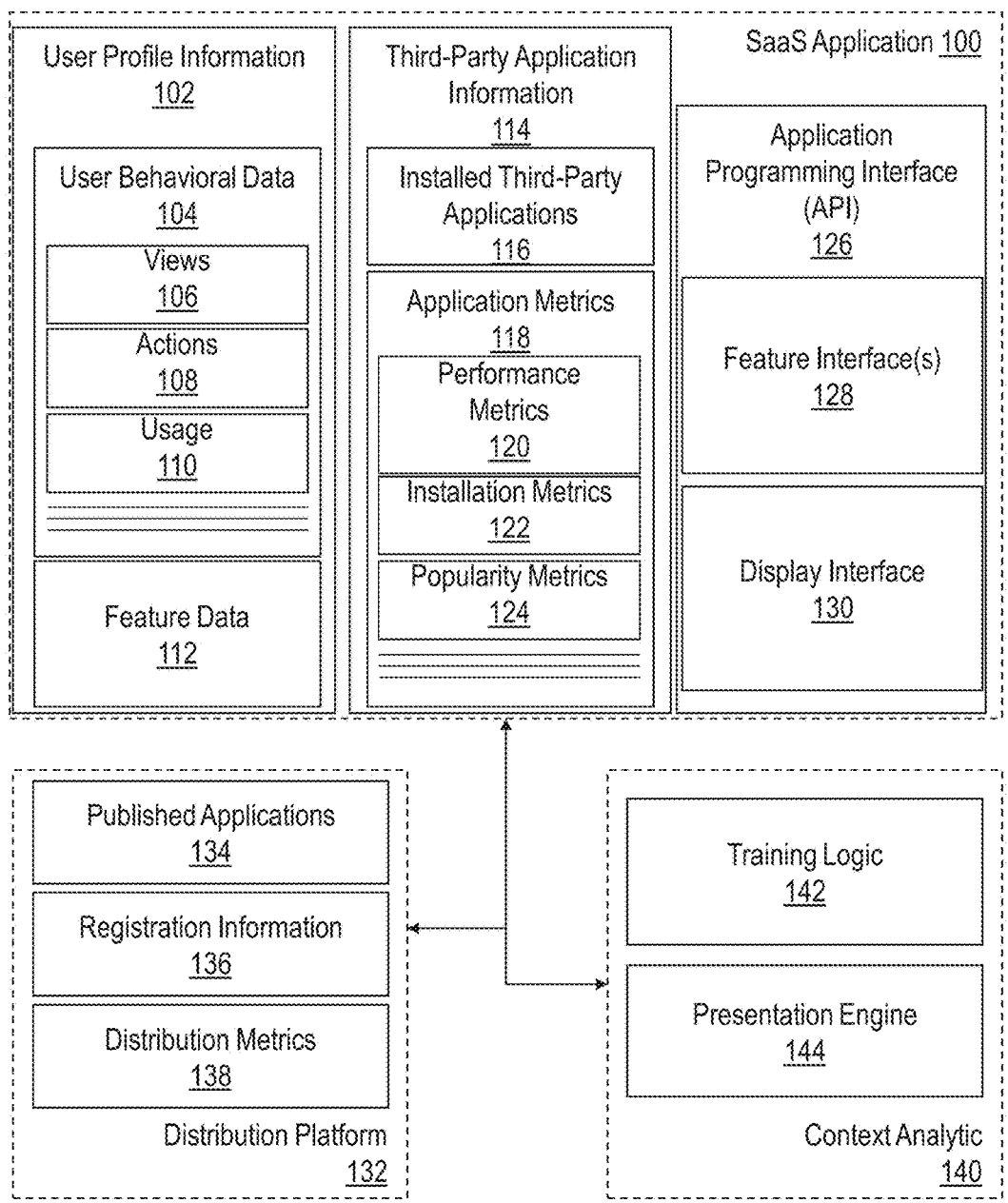
FIG. 1 illustrates a system for performing context-based analytics to extend the functionality of an application in accordance with one or more embodiments.

FIG. 1 illustrates a system for performing context-based analytics to extend the functionality of an application in accordance with one or more embodiments. The system generally comprises software-as-a-service (SaaS) application 100, context analytic 140, and distribution platform 132. Components within the system may be implemented in one or more network hosts operating within one or more clouds or other networked environments. Example network hosts include, but are not limited to, servers, workstations, desktops, laptops, mobile devices, and other computing devices that are configured to communicate using one or more protocols of the internet protocol (IP) suite.

SaaS application 100 is a software system comprising a set of software resources that are provided to end users as a service. Example SaaS applications include, but are not limited to, database servers, customer relationship management (CRM) systems, middleware application, and any other enterprise application. Components of SaaS application 100 generally comprise user profile information 102, third-party application information 114, and application programming interface (API) 126. In addition, components of SaaS application may comprise a plurality of features that provide a variety of functions/services as discussed in further detail below. An SaaS application is being referred to herein for the purposes of explanation. However, some embodiments described herein are equally applicable to non-SaaS applications. SaaS application 100 may correspond to the "initial application" as referred to herein.

In one or more embodiments, multiple users may subscribe or otherwise register with a provider to access SaaS application 100. In response to registering with the provider, an individual user or group of users may be associated with a new user account with access privileges to use one or more features of SaaS application 100. The access privileges attached to the user account may provide access to the entire set of features available within SaaS application 100 or some subset thereof. An individual user account may be associated with a single user or multiple users. Registered users may download and install SaaS application 100 on a local machine and/or may access the application over a network from a remote network location using a separate application, such as a browser. A "user" as used herein may refer to a subscriber, a user account with privileges to access one or more features of SaaS application 100, a human user, and/or a separate application that accesses SaaS application.

SaaS application 100 maintains, within volatile and/or non-volatile storage, user profile information 102. User profile information 102 captures data that provides context about how end users are using SaaS application 100. Specifically, user profile information 102 captures user behavioral data 104, which tracks current and/or historical behavioral patterns of one or more end users, and feature data 112, which identifies features that end users are currently accessing within SaaS Application 100.

User behavioral data 104 comprises data tracking views 106, actions 108, and usage 110 within SaaS application 100 by end users. Views 106 corresponds to visual representations requested by a user. For example, views 106 may represent data identifying graphs, charts, or any other graphical data sets generated for and accessed by a user. Actions 108 represents data that identifies function calls, requests, and/or other actions performed by SaaS application 100 on behalf of an end user. In the context of a CRM application, for instance, actions 108 may track requests to generate forecasts, database queries to aggregate CRM data, and other processes executed by the CRM application for the user. Usage 110 comprises data that tracks usage patterns of one or more end users. For instance, usage 110 may comprise statistical data that identifies how frequently users access views, perform actions, or otherwise access features within SaaS application 100. In other embodiments, user behavioral data 104 may capture other user behavioral information in addition or as an alternative to views 106, actions 108 and/or usage 110. Thus, the types of behavioral information tracked and maintained by SaaS application 100 may vary from implementation to implementation.

Feature data 112 comprises data identifying features within SaaS application 100 that are currently being accessed by end users. The features that are available within SaaS application 100 may vary depending on the application design and the privileges associated with the user. In the context of a CRM application, for instance, the features may include, but are not limited to, sales pipeline reporting, forecasting, campaigning, and/or customer feedback management. Each of these features may comprise sub-features as described further below. The feature data may be updated in real-time as the user is navigating SaaS application 100. For instance, if a user account is accessing a forecasting feature of the CRM application, then feature data 112 may be generated to identify the forecasting feature being accessed. If the user then navigates to the campaigning feature of the CRM application, then feature data 112 for the user account may be updated accordingly to identify the campaigning feature.

SaaS application 100 further maintains, within volatile and/or non-volatile storage, third-party application information 114. Third-party application information 114 captures data that provides context about how end users are integrating third-party applications with SaaS application 100. Third-party application information 114 comprises installed third party applications 116 and applications metrics 118.

Installed third-party applications 116 represents a set of software applications that extend the functionality of SaaS application 100. Example third-party applications include, but are not limited to plugins, add-ons, extensions, and/or any other software application that may integrated with SaaS application 100. The installed third-party application that are available may vary from user to user. As an example, a plugin may be added to SaaS application 100 using the access privileges attached to one user account and made available to one or more users associated with the user account. Users associated with separate accounts may not have access to the plugin unless the plugin is separately authorized and installed.

Application metrics 118 measure various attributes associated with third-party applications 116. In one or more embodiments, application metrics 118 comprises performance metrics 120, installation metrics 122, and popularity metrics 124. Performance metrics 120 capture metric data that measures one or more performance attributes of a third-party application. As an example, performance metrics 120 may include, but are not limited to, efficiency metrics that quantify differences in efficiency between the third-party application and SaaS application 100 in performing a task. If a third-party application reduces the number of steps in a workflow or the time needed to accomplish a particular task, for instance, then this information may be included in performance metrics 120. Installation metrics 122 track installation information associated with installed third-party applications 116. For instance, installation metrics 122 may track resource requirements for a third-party application, installation problems, if any, etc. Popularity metrics 124 track the popularity of third-party applications among end users. Example popularity metrics for a third-party application may include, but are not limited to, user ratings, number of installations, and number of accesses.

API 126 provides an interface through which third-party applications may be integrated with SaaS application 100. In one or more embodiments API 126 comprises feature interface(s) 128 and display interface 130. Feature interface(s) 128 provide a mechanism through which installed third-party applications 116 may access and/or otherwise interact with one or more features of SaaS application 100. For example, an interface for a given feature may comprise a set of subroutine definitions, messaging protocols, and services that allow a third-party application to invoke functions and access resources that are associated with the given feature of SaaS application 100. Display interface 130 provides a mechanism through which installed third-party applications 116 and context analytic 140 may cause visual objects to be displayed through SaaS application 100. As an example, installed third-party applications 116 and/or context analytic 140 may cause boxes, menus, charts, buttons and other graphical user interface (GUI) elements to be displayed within a GUI window of SaaS application 100 during execution by invoking one or more functions provided through display interface 130.

Distribution platform 132 is a channel through which developers may publish third-party applications for consumption by end users. For example, distribution platform 132 may be an app store, website, or any other network channel that provides access to published applications 134. Published applications 134 may comprise software components, such as software binaries, executables, files and/or other components through which third-party applications may be installed and integrated with SaaS application 100.

In one or more embodiments, published applications 134 undergo a registration process before publication. If a developer would like to register a new plugin that is compatible with SaaS application 100, for instance, then the developer may submit a registration request to distribution platform 132. In response, distribution platform 132 may perform a set of validation tests to verify the compatibility and security of the plugin with SaaS application 100. If the third-party application passes the set of validation tests, then registration information 136 is generated for the third-party application and the application is published such that end users may download and install the application.

Distribution platform 132 maintains, within volatile and/or non-volatile storage, registration information 136 for published applications 134. Registration information 136 may generally comprise data that identifies and describes published applications 134. Example registration information may include, but is not limited to, application registration names and other identifiers, application compatibility information, and a descriptions of the types of data sets and features within SaaS application 100 that are accessed by the third party application.

Distribution platform 132 further maintains, within volatile and/or non-volatile storage, distribution metrics 138 for published applications 134. Distribution metrics 138 for a corresponding published application generally track or measure the distribution of the corresponding third-party application among end-users of SaaS application 100. Example distribution metrics may include, but are not limited to, the number of times the published application has been viewed by users of distribution platform 132, the number of times the third-party application has been purchased/downloaded from distribution platform 132, and the number of trial version of the third-party application that have been requested.

Context analytic 140 comprises logic for analyzing the context in which users access features within SaaS application 100 and presenting third-party applications to end users based on the analysis. Context analytic 140 may be a components of SaaS application 100 or may be part of a separate application, depending on the particular implementation. If part of a separate application, context analytic 140 may be integrated with SaaS application 100 through API 126. For example, context analytic 140 may present third-party application recommendations within an application window of SaaS application 100 by invoking display commands made available by SaaS application 100 through display interface 130.

Context analytic 140 generally comprises training logic 142 and presentation engine 144. Training logic 142 collects context data from SaaS application 100 and/or distribution platform 132, and uses the training data to analyze a feature context. For example, training logic 142 may collect user profile information 102, feature data 112, third-party application information 114, and distribution metrics 138 and use this information to determine the circumstances under which features of SaaS application 100 are accessed. Based on an analysis of the collected data, training logic 142 trains presentation engine 144 to present third-party applications to users of SaaS application 100 based, in part, on the feature that the users are accessing within the application.

Figure 2:
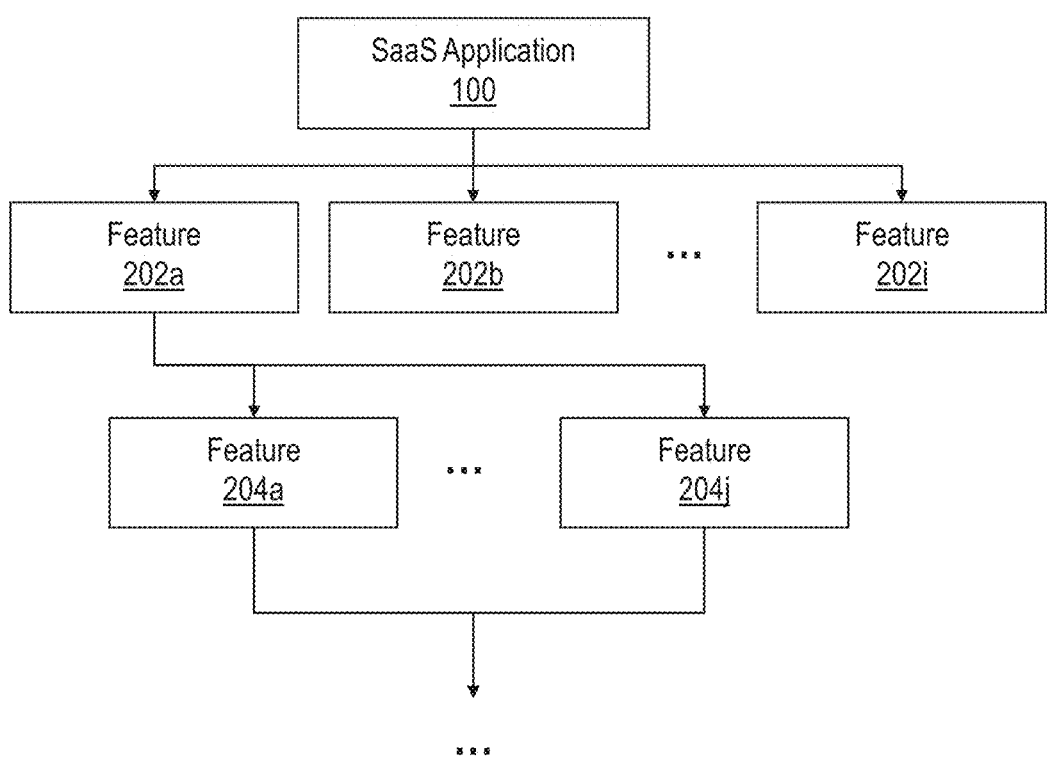
FIG. 2 illustrates a feature hierarchy of a software application in accordance with one or more embodiments.

In one or more embodiments, SaaS application 100 comprises a hierarchy of features that may be accessed by end users. As an example, FIG. 2 illustrates a feature hierarchy for SaaS application 100 in accordance with one or more embodiments. The first level of the feature hierarchy comprises a plurality of features, including, but not limited to, feature 202a, feature 202b, and feature 202i. A "feature" in this context refers to functionality or a set of functions within the application that are related to a particular purpose or category of operations. In the context of a CRM application, for instance, feature 202a may correspond to a set of application functions for performing sales pipelining operations, feature 202b may correspond to a set of functions for performing forecasting operations, and feature 202i may correspond to a set of functions for performing marketing operations. In another example, an enterprise management application may include a feature for updating software and hardware resources ("target resources") within a datacenter, a feature for forecasting usage of the target resources, a feature for performing backups, etc.

Each feature may comprise one or more sub-features. Referring to FIG. 2, feature 202a includes, but is not limited to, feature 204a and 204j. In the context of a CRM application, for instance, the sales pipelining feature may include sub-features for defining workflow processes, reporting on the status of workflow processes, etc. Each of these features may comprise additional sub-features, depending on the design of SaaS application 100.

A "feature" as used herein may include a feature or any sub-feature within a hierarchy. Each feature may manage, generate, and/or otherwise be associated with data of different types. For example, a forecasting feature may be responsible for managing forecast data within a CRM application, a marketing feature may be responsible for managing campaign data, etc.

3. Context-Based Presentations

In one or more embodiments, context analytic 140 is configured to present third-party applications based on a contextual analysis of the features that are accessed by end users of SaaS application 100. Training logic 142 may determine which applications to present, based at least in part, on a determination of which third-party applications are likely to optimize the user experience and performance of SaaS application 100. For example, if a user is accessing a forecasting feature of an application, training logic 142 may identify third party applications that improve the accuracy of a forecast, reduce the number of steps needed to generate a particular view of a forecast, or optimize the forecasting feature in some other way. Presentation engine 144 may then present the third-party application to the user to provide insights into what third-party applications may improve the forecasting feature currently accessed by the user.

Figure 3:
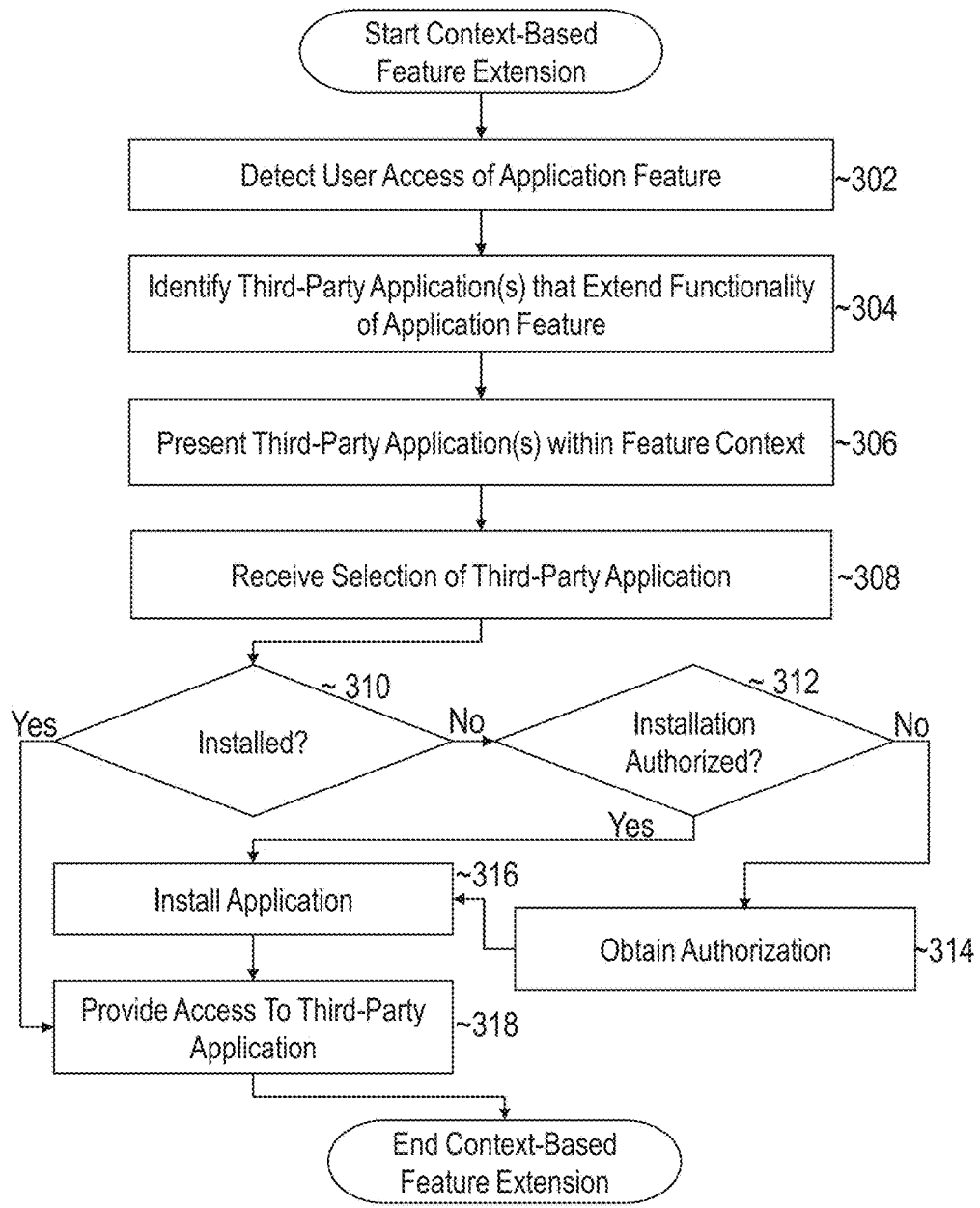
FIG. 3 illustrates an example set of operations for performing a context-based feature extension in accordance with one or more embodiments.

FIG. 3 illustrates an example set of operations for performing a context-based feature extension in accordance with one or more embodiments. While SaaS application 100 is executing on one or more host machines, context analytic 140 detects that a user is accessing an application feature (Operation 302). For example, if a user navigates to a forecasting feature of SaaS application 100, then SaaS application 100 may generate/update feature data 112 to indicate that the user is currently accessing this feature. Context analytic 140 receives feature data 112 and parses the data to determine that the user is currently accessing the forecast feature. If the user then navigates to a sub-feature, then feature data 112 may be updated to identify the parent feature and the sub-feature that the user is accessing. Context analytic 140 is configured to detect the updated feature data and adjust the analysis accordingly.

Based on the feature that the user is currently accessing, context analytic 140 identifies a set of one or more third-party applications that extend the functionality of the application feature (Operation 304). In one or more embodiments, context analytic 140 determines which third-party applications extend the functionality of the application feature based on the types of data sets the third-party applications are configured to access. As an example, a third-party application that extends a forecasting feature may be configured to invoke functions exposed by an API for the forecasting feature. The third-party application may further be configured to read, modify, or otherwise access data objects, such as time-series data sets and/or forecasting models, that are exposed through the feature's API.

In one or more embodiments, context analytic 140 determines feature compatibility of a third-party application based on registration information 136. For example, registration information 136 may include data identifying (a) the APIs invoked by the third-party application, (b) the data objects accessed by the third-party application, and/or (c) the feature/sub-features of SaaS application 100 extended by the third-party application. Based on registration information 136, context analytic 140 may determine if the third-party application is compatible with the feature currently being accessed by the user. Third-party applications that do not extend the functionality of the feature may be excluded from set of third-party applications identified by context analytic 140 during this operation.

Once the set of third-party applications has been identified, presentation engine 144 presents the set of one or more third-party applications within a feature context of SaaS application 100 (Operation 306). For example, presentation engine 144 may provide links through which the identified third-party applications may be downloaded, installed, and/or otherwise accessed by an end user. The presentation of a third-party application may include a set of presentation data that represents the identified third-party applications. Example presentation data for a corresponding third-party application may include, but is not limited to, an application name, a logo associated with the application, application metrics, and a description of the application's features.

In one or more embodiments, presentation engine 144 presents third-party applications that extend or otherwise enhance the functionality of an application feature in such a way as to provide access to the third-party applications without requiring the user to leave a context of the feature. For example, the third-party applications may be concurrently presented within a same window or other graphical element as the feature that a user is accessing. Thus, the user may view and directly access the third-party applications that optimize a given feature without having to switch contexts and explicitly search for relevant third-party applications. Thus, the search costs associated with identifying third-party applications may be eliminated as no user input is required to view and access third-party applications that improve the performance of existing features within SaaS application 100. In addition, the presentation data apprises the user of third-party applications that extend and optimize the functionality of SaaS application 100 even though the user may not be aware of the third-party applications.

If the user identifies a third-party application of interest, the user may select the third-party application directly from the data that is presented with the feature context of SaaS application 100. For example, the user may click an application link or otherwise interact with presentation data generated for the third-party application and presented within a GUI element of SaaS application 100. In response, context analytic 140 receives information identifying the third-party application selected by the user (Operation 308).

In one or more embodiments, the selected third-party application may already be installed. Presenting installed third-party applications to an end user may be useful if the user is unaware of the third-party applications that are available for use. This scenario may occur where there are multiple users associated with an account, and one user is unaware of the third-party applications installed by another user, such as an administrator. In this case, context analytic 140 determines whether the selected third-party application has already been installed (Operation 310). If the third-party application has not been installed, then the process proceeds to operation 312. Otherwise, the process jumps to operation 318.

If the third-party application has not been installed or if presentation engine 144 has been configured to present only third-party applications that have not been installed, then context analytic 140 determines whether installation of the third-party application is authorized (Operation 312). If installation is not authorized, then the process continues to operation 314. If the user is authorized to install the application, then the process proceeds to operation 316.

In some cases, a user may be authorized to install a trial version of the application but not the full version. In one or more embodiments, presentation engine 144 may present the option to install a trial version and/or a full version of the application based on the privileges attached to the users. A trial version in this context may refer to a version of the third-party application that does not provide all the functionality of a full version of the third-party application and/or a version that is the user may no longer access after a trial period has lapsed.

If installation of the third-party application is not authorized, then context analytic 140 obtains authorization (Operation 314). If the user that has selected the third-party application has privileges to install the third-party application, then a prompt may be displayed to the user to obtain authorization information. Example authorization information may include, but is not limited to a username, password, authentication token, and/or other authorization credentials.

In some cases, the user that has selected the third-party application may not have privileges to install third-party applications. As an example, a user account for an enterprise may be associated with a plurality of users with different privileges. A subset of the users, such as an administrative user, may have privileges to authorize third-party application installation.

If the user does not have privileges to install third-party applications, then context analytic 140 may submit a request to install the application to a user that is authorized. For instance, user profile information 102 may store information identifying privileges for different users associated with an account. Context analytic 140 may analyze the user profile information 102 to determine which user is authorized to install third-party applications. Once the authorized user is identified, context analytic 140 may generate and submit a request to install the application to the user. The request to install the application may be presented in a notification displayed to the authorized user and/or may be stored in a queue for the authorized user. If the user is not logged in to the user account at the time of the request, then the installation requests within the queue may be presented to the authorized user the next time the user logs into SaaS application 100. Once connected to SaaS application 100, the administrative user may view and interact with items in the queue to allow or deny authorization to pending installation requests.

Once installation of the third-party application has been authorized, then context analytic 140 causes the selected third-party application to be installed and integrated with SaaS application 100 (Operation 316). In one or more embodiments, context analytic 140 initiates a transaction between distribution platform 132 and the user to download and install the application. The transaction may occur within the feature context of SaaS application 100 such that the user does not need to navigate to a display of a separate application to complete the download and installation of the third-party application.

After installation, SaaS application 100 provides the user with access to the selected third-party application. For example, SaaS application 100 may invoke code associated with the third-party application and cause one or more functions of the third-party application to be executed. During execution, the third-party application may communicate with SaaS application 100 using API 126 to access functions and data sets associated with the feature that is extended by the third-party application. For instance, a third-party application that enhances visualization of a forecast may invoke functions of a forecasting API to access forecast data used by the third-party application to generate the visualization. Other third-party application may similarly access other types of data sets based on the design of the third-party application and SaaS application 100.

If the user navigates to a new feature within SaaS application 100, then the process may return to operation 302 to update the third-party applications that are presented to the end user. As an example, if the user switches from a forecasting feature to a marketing feature within a CRM application, the presentation may be updated to recommend third-party applications that extend the functionality of the campaign feature rather than the forecasting feature. As another example, if the user drills down to a sub-feature, the presentation may be updated to present third-party applications that are more relevant to the selected sub-feature. In the context of the forecasting feature for instance, presentation engine 144 may initially recommend a set of third-party applications that generally extend the forecasting functionality. If the user then drills down to create a new cycle plot, for instance, presentation engine 144 may update the presentation to recommend a set of third-party application that extend the cycle plot functionality of the forecasting feature. Thus, the presentation of third-party applications may be modified based on the feature context that is currently being viewed by the end user.

4. Context-Based Training

In some cases, there may be a relatively large number of third-party application that are compatible with a particular feature even though many of the third-party applications may not be relevant to an end user. If relevance to the end user is not taken into account during the presentation, then the end user may have to sift through a large number of items to identify third-party applications that are of interest or may ignore the presentation altogether. In order to increase the effectiveness of the presentation, training logic 142 may train presentation engine 144 to account for user-specific attributes and/or metrics associated with the third-party applications when generating the presentation. For example, presentation engine 144 may be trained to present user-specific recommendations based on the third-party applications that are most likely to optimize a feature of the SaaS application 100 with respect to how a user that is the target of the presentation uses the feature.

Figure 4:
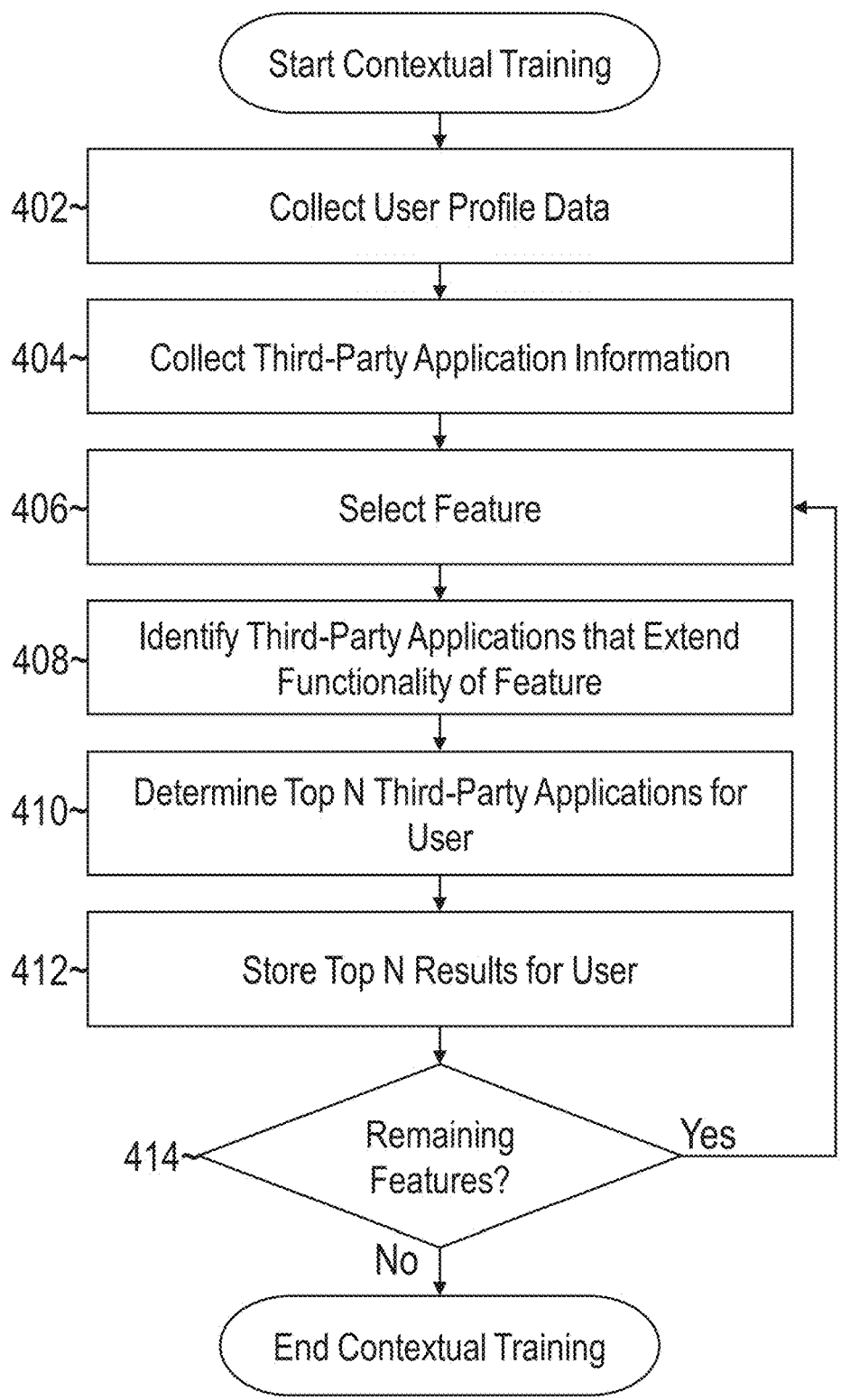
FIG. 4 illustrates an example set of operations for performing contextual training of a presentation engine in accordance with one or more embodiments.

FIG. 4 illustrates an example set of operations for performing contextual training of presentation engine 144 in accordance with one or more embodiments. The training process may be triggered in response to detecting a user interacting with a particular feature, may be performed periodically, or may be triggered on demand depending on the particular implementation. The process includes collecting profile data for the target user (Operation 402). For example, training logic 142 may collect user behavioral data 104 to determine user behavioral patterns with respect to SaaS application 100, such as the most frequent views and action requested by the user. Training logic 142 further collects feature data 112 to determine the feature that the target user is currently accessing, if any.

In addition to the user profile information, the process collects third-party application information from SaaS application 100 and/or distribution platform 132 (Operation 404). For example, training logic 142 may collect application metrics 118, distribution metrics 138, and/or any other information relating to the third-party applications that are compatible with one or more features of SaaS application 100.

Once the process has collected the user behavioral data and the third-party application information, the process selects a feature of application (Operation 406). As an example, a feature that is selected for analysis may comprise a feature or sub-feature that is currently being viewed or otherwise accessed by a user. In other embodiments, the process may select a feature that is not being currently accessed. For example, the process may traverse select a feature from a feature hierarchy such as depicted in FIG. 2 prior to a user accessing a feature.

After a feature has been selected for analysis, training logic 142 identifies a set of one or more third-party applications that extend the functionality of the feature (Operation 408). As previously described, the determination may be made based, at least in part, on detecting which data sets the third-party applications are configured to access. For example, if a forecasting feature has been selected, then training logic 142 may parse third part application information obtained from SaaS application 100 and/or distribution platform 132 to identify third-party applications that are configured to invoke functions or data objects exposed by an API for the forecasting feature.

In order to increase the likelihood that the presented third-party applications are relevant to the user, training logic 142 determines the top-n third-party applications for the selected feature and user (Operation 410). The determination of the top-n third-party application may vary depending on the particular implementation. Example parameters (herein referred to as "selection parameters') that may be factored into the selection of the top-n third-party application include, but are not limited, to one or more attributes captured by user profile information 102, third-party application information 114, registration information 136 and/or distribution metrics 138.

In one or more embodiments, identifying the top-n applications comprises filtering applications based on one or more selection parameters including one or more attributes within user profile information 102. As an example, training logic 142 may determine the most frequent workflow of the user within the context of the selected feature. Training logic 142 may then analyze the third-party application information to determine which applications are relevant to the workflow of the user. In the context of a forecasting feature, for instance, training logic 142 may determine that the target user frequently generates quarterly sales forecasts. Training logic 142 may then sort the applications based on which third-party applications are related to generating quarterly sales forecasts and filter those that are not applicable. As another example, training logic 142 may filter applications based, at least in part, on a domain or role associated with a user. For instance, third-party applications that are relevant to a user in the technology domain may not be relevant to a user in the financial services domain. Thus, presentation engine 144 may be trained to present a different set of third-party applications to users in the technology domain than users in the financial services domain. In other examples, training logic 142 may predict the most relevant applications based on the views, actions, and/or other usage patterns associated with the target user. Third-party applications that are determined not to be relevant are filtered out such that presentation engine 144 does not present these applications to the target user.

In addition or as an alternative to filtering the applications, identifying the top-n applications includes sorting the third-party applications based on a set of sorting criteria. The sorting criteria may vary from implementation to implementation and may be performed using one or more of the selection parameters previously described. As an example, once irrelevant applications have been filtered, the remaining set of applications may be sorted based on user-rating. As another example, the applications may be sorted based on which applications reduce the number of steps in the most frequent workflow of the target user for the selected feature.

Any other metric or combination of metrics may also be used to rank and sort the applications.

Once the top-n results have been determined, context analytic 140 stores, in volatile and/or non-volatile memory, data that maps the results to the user and feature. Presentation engine 144 accesses the stored results to determine which third-party applications to present to the target user when the user is accessing the corresponding feature.

After the top-n results have been stored, training logic 142 determines whether there are remaining features to analyze (Operation 414). For example, training logic 142 may traverse sub-features of the feature being currently accessed by the user to pre-fetch third-party application information in the event that the user drills down. In other embodiments, training logic 142 may only train the presentation engine for the feature that is currently being accessed by the user. If there are remaining features, then the process selects a new feature and repeats operations 408 to 412 for the newly selected feature. Otherwise, the training process ends.

The training process may generate unique result sets for different combinations of users and features. For example, a user accessing a forecasting feature may be presented with a result set that is most likely to optimize the forecasting feature based on an analysis of the user's behavioral patterns. If a different user is accessing the forecasting feature, a different set of applications may be presented to optimize for the different attributes and behavioral patterns of the user. In addition or alternatively, if a user navigates to a different feature, then presentation engine 144 may change the recommendations as the third-party applications that are most likely to optimize the forecasting feature may not pertain to the newly selected feature.

5. Context-Based Cloud Analytics

As previously mentioned, multiple subscribers may access features within SaaS application 100. In some cases, different subscribers may have different third-party applications installed. As an example, one set of subscriber may have access to a third-party application directed to improving forecast accuracy in capacity planning operations while a different set of subscribers may have access to a third-party application that optimizes visualizations of sales forecasts. Due to privacy restrictions, different subscribers may not be aware of the third-party applications that other subscribers are using. However, this information may be useful to determine which third-party application may optimize performance of SaaS application 100 for other subscribers.

In one or more embodiments, training logic 142 is configured to perform cloud-based analytics by training presentation engine 144 based on information collected from different subscribers. As an example, training logic 142 may analyze user behavioral data 104 and application metrics 118 with respect to subscribers that have installed and accessed a particular third-party application. As part of the analysis, training logic 142 may determine if the third-party application would optimize the feature for other subscribers that have not installed the third-party application. If so, presentation engine 144 may present the third-party application to these subscribers while the subscribers are viewing or otherwise accessing the feature.

Figure 5:
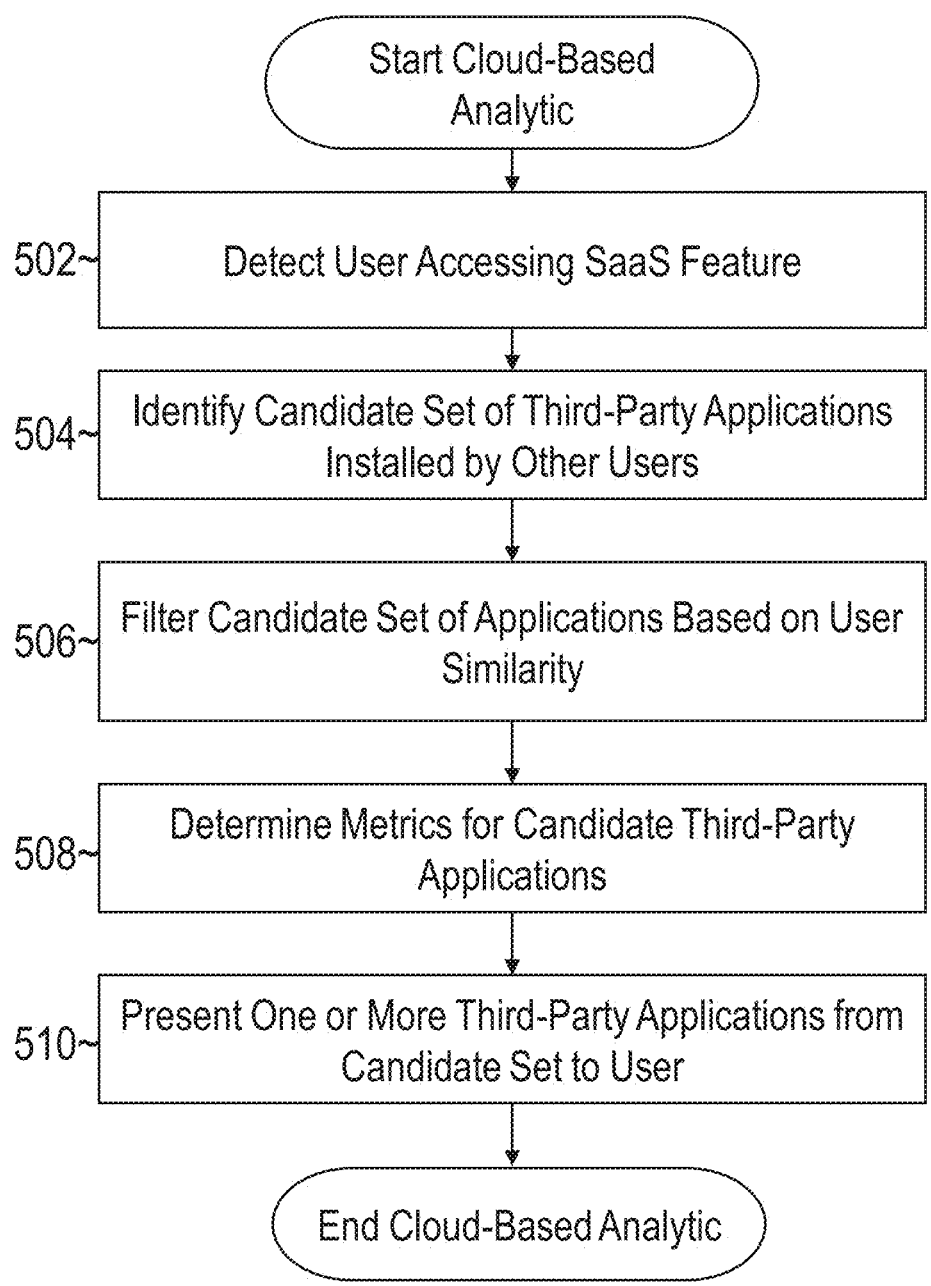
FIG. 5 illustrates an example set of operations for performing a cloud-based contextual analysis to extend the functionality of an application in accordance with one or more embodiments.

FIG. 5 illustrates an example set of operations for performing a cloud-based contextual analysis to extend the functionality of an application in accordance with one or more embodiments. The process includes detecting that a target user for the presentation is accessing an SaaS feature. (Operation 502). As previously indicated, context analytic 140 may determine the feature that a target user is accessing based on user profile information 102.

In response to detecting that the user is accessing the feature of SaaS application 100, the process identifies a set of third-party application that extend the feature and have been accessed by one or more users other than the target user (Operation 504). For example, context analytic 140 may parse third-party application information 114 to identify which of installed third-party applications 116 access data sets of the same type as the feature that is being currently accessed by the target user. Context analytic 140 may further determine which of the compatible third-party applications is not currently installed or otherwise accessible to the target user. The compatible third-party applications that are not currently installed by the target user are grouped as a candidate set of third-party applications.

Once the candidate set of third-party applications has been identified, the process filters the candidate set based on user similarity. (Operation 506). As part of the filtering operation, third-party applications that are not accessed by users similar to the target user may be removed from the candidate set. Filtering may help increase the relevance of the third-party applications as it is more likely that the target user is interested in how similar users are optimizing the feature the target user is currently viewing. For instance, a subscriber that uses a forecasting feature to project future sales may be more interested in third-party applications that other subscribers are using to optimize sales projections rather than subscribers that are using the forecasting feature to project resource usage or some other data.

The manner in which context analytic 140 determines user similarity may vary from implementation to implementation. In one or more embodiments, user similarity is determined based on one or more user attributes maintained in user profile information 102. For example, context analytic 140 may classify users as similar if assigned the same role or domain. Thus, context analytic 140 may classify users in the financial services domain as similar while users from different domains may be classified as dissimilar. As another example, context analytic 140 may determine similarity based on the behavioral patterns. A user that frequently performs the same actions as the target user may be classified as similar, while users that typically perform different actions may be classified as dissimilar.

After the final candidate set of third-party applications has been determined, the process determines a set of metrics for each candidate third-party application (Operation 508). In one or more embodiments, the metrics are used to determine which third party applications are most effective for users that are similar to the target user. Example metrics include, but are not limited to, performance metrics 120, installation metric 122, and popularity metric 124. Context analytic 140 may analyze these metrics to determine performance gains, installation problems, and/or the popularity of each third-party application in the candidate set of third-party applications Based on the metrics assigned to the candidate third-party applications, presentation engine 144 presents one or more third-party applications in the candidate set of third-party applications to the target user (Operation 510). In one or more embodiments, presentation engine 144 determines a ranking for the third-party applications in the candidate set of third-party applications based on the metrics and presents the top-n third-party applications to the target user. The manner in which third-party applications are ranked may vary from implementation to implementation. In one example, presentation engine 144 may be configured to present the most highly rated third-party applications based on ratings received from users that are similar to the target user. As another example, presentation engine 144 may be configured to present the third-party application that optimizes the most common actions taken by the target user by the greatest amount for other users that perform similar actions. The ranking may similarly be assigned based on other metrics or combinations of metrics described above.

6. Example Presentation Interface

As previously mentioned, presentation engine 144 may cause third-party applications to be concurrently displayed within an application window while the user is accessing a particular feature. FIG. 6A illustrates an example interface that includes links to third-party applications within the context of a forecasting feature concurrently accessed by an end user, in accordance with one or more embodiments. Display 600 represents an application window that is displayed in response to a user navigating to a sales forecasting feature of a CRM application. GUI pane 602 allows the user to drill down to sub-features that are associated with the sales forecasting feature, GUI pane 604 allows the user to search within the context of the sales forecasting feature, and GUI pane 606 presents pending forecasting tasks to the user, if any. GUI pane 608 displays recommended third-party applications concurrently while the user is accessing the forecasting feature. GUI pane 608 is included in the same application window as the other GUI boxes associated with the forecasting feature such that the user does not need to leave the context of the forecasting feature to access the recommended third-party applications.

GUI pane 608 presents three separate third-party applications, although the number of applications that are presented may vary from implementation to implementation. Each item in the presentation includes a logo, a name, and a description of a corresponding third-party application. Further, third-party applications are grouped based on whether the user has already installed the application or not. If the user selects an application (e.g., by clicking on or around the text or logo associated with the application) that is already installed, then the third-party application may be opened or otherwise made accessible to the user. For example, functions associated with the third-party application may be presented within GUI pane 608, some other location within display 600 or in a separate application window. If the user selects an application that is not installed, the user may be prompted to authorize installation as previously described unless authorization has been previously obtained. If authorization has not been obtained, then a prompt may be displayed within GUI pane 608, some other location within display 600 or in a separate application window to authorize purchase and installation. Once authorized and installed, the user may access the third-party application in the same manner described above for the installed application.

Figure 6B:
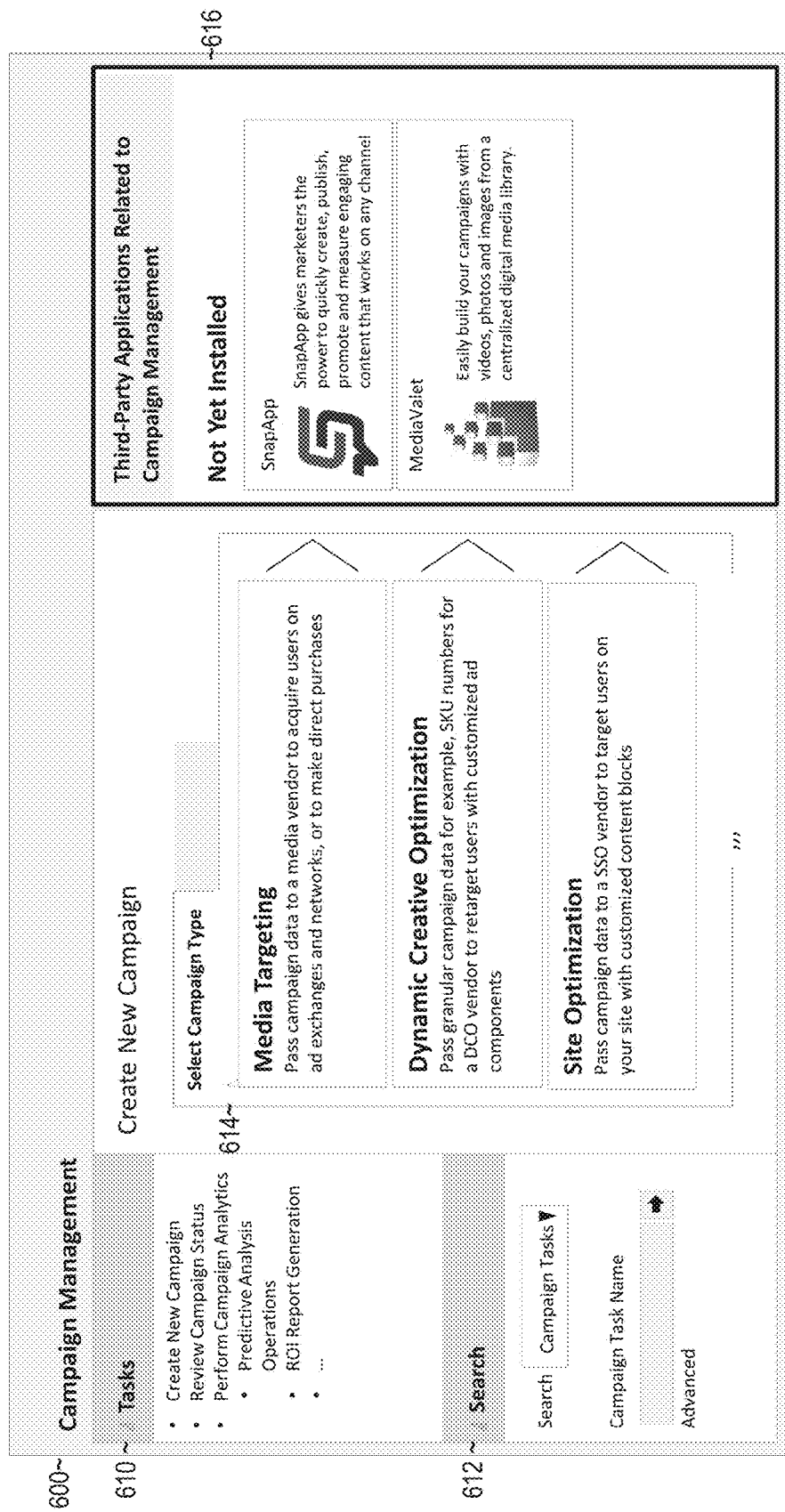
FIG. 6B illustrates an example interface that includes presentation of third-party applications within the context of a forecasting feature concurrently accessed by an end user, in accordance with one or more embodiments.

FIG. 6B illustrates an example interface that includes links to third-party applications within the context of a campaigning feature concurrently accessed by an end user, in accordance with one or more embodiments. This display may be presented in response to the user navigating away from the sales forecasting feature within SaaS application 100 to a campaign feature offered by the same application. In response to navigating away, display 600 is updated to include GUI pane 610, GUI pane 612, GUI pane 614, and GUI pane 616. GUI pane 610 allows the user to drill down to perform various tasks associated with campaign operations, GUI pane 612 allows the user to search within the context of the campaign feature, and GUI pane 614 allows the user to perform various operations associated with creating a new campaign. GUI pane 616 presents an updated set of third-party applications based on the context of the backup feature. As can be seen, the recommended third-party applications are directed to optimizing the performance of campaign operations rather than forecasting operations.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 7 is a block diagram that illustrates computer system 700 upon which one or more embodiments may be implemented. Computer system 700 includes bus 702 or other communication mechanism for communicating information, and hardware processor 704 coupled with bus 702 for processing information. Hardware processor 704 may be, for example, a general purpose microprocessor.

Computer system 700 also includes main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes read only memory (ROM) 708 or other static storage device coupled to bus 702 for storing static information and instructions for processor 704. Storage device 710, such as a magnetic disk or optical disk, is provided and coupled to bus 702 for storing information and instructions.

Computer system 700 may be coupled via bus 702 to display 712, such as a cathode ray tube (CRT), liquid crystal display (LCD), or light-emitting diode (LED), for displaying information to a computer user. Input device 714, which may include physical and/or touchscreen based alphanumeric keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to host computer 724 or to data equipment operated by Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, server 730 might transmit a requested code for an application program through Internet 728, ISP 726, local network 722 and communication interface 718.

The received code may be executed by processor 704 as it is received, and/or stored in storage device 710, or other non-volatile storage for later execution.

8. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer-readable media comprising instructions which, when executed by one or more hardware processors, causes performance of operations comprising:

detecting that a user is accessing a particular feature, of a first application, wherein the particular feature is associated with a set of feature data that identifies a function performed by the particular feature of the first application;

determining, based on the set of feature data, that a second application is configured for operations that extend the function performed by the particular feature of the first application;

responsive at least to determining that the second application is configured for operations that extend the function performed by the particular feature of the first application and detecting that the user is accessing the particular feature to perform the function presenting, via an interface of the first application, the second application to the user when the user is accessing the particular feature of the first application;

receiving a user input that drills down to a sub-feature of the particular feature, wherein context data is configured to identify the particular feature as a parent feature of the sub-feature that the user is currently accessing;

responsive to the user input that drills down to the sub-feature of the particular feature, updating the interface of the first application to present at least a third application that is more relevant to the sub-feature than the second application initially presented to the user;

receiving, through the interface of the first application, user input that selects the third application; and responsive to receiving, through the interface of the first application, the user input, performing one of installing or triggering execution of the third application to perform at least one operation that extends the function performed by the particular feature of the first application, wherein the at least one operation accesses one or more data objects that are shared with the particular feature and exposed through an application programming interface for the particular feature of the first application, wherein the at least one operation performs one or more additional functions on the one or more data objects that are shared with the particular feature of the first application to enhance the function performed by the particular feature.

2. The one or more non-transitory computer-readable media of claim 1, further comprising:

determining whether the third application has already been installed;

in response to determining that the third application has not been installed, presenting an option to install at least one of a full-version or a trial version of the third application; and in response to determining that the third application has been installed, presenting a link to open the third application.

3. The one or more non-transitory computer-readable media of claim 1, wherein the third application is one of a plurality of third-party applications that is configured to extend the function of the particular feature of the first application, and wherein the operations further comprise:

ranking the plurality of third-party applications, based at least in part, on one or more of performance of the third-party applications, popularity of the third-party applications, or relevance of the third-party applications to the user; and presenting a subset of the third-party applications in an order that is based on the ranking operation.

4. The one or more non-transitory computer-readable media of claim 1, wherein the third application is selected for presentation to the user based, at least in part, on detecting that one or more other users of the first application have installed the third application.

5. The one or more non-transitory computer-readable media of claim 1, wherein the third application is an application that has already been installed, the operations further comprising:

displaying concurrently with the third application, a fourth application that is configured for operations that extends the function of the particular feature and that has not been installed.

6. The one or more non-transitory computer-readable media of claim 1, the operations further comprising detecting that the user has navigated away from the particular feature to a second feature, of the first application, that accesses a data set of a second type, responsive at least to detecting that the user has navigated away from the particular feature to the second feature, of the first application, presenting a fourth application to the user, wherein the fourth application is configured for operations that access data sets of the second type.

7. The one or more non-transitory computer-readable media of claim 1, the operations further comprising:
responsive at least to detecting that a user is accessing the particular feature, of the first application:
identifying a plurality of third-party applications that extend the function of the particular feature;
for each respective third-party application of the plurality of third-party application, determining a set of metrics that measures a performance of the third-party application with respect to the particular feature of the first application;
determining the top-n highest performing third-party applications based on the set of metrics; and
presenting, to the user, the top-n highest performing third-party applications to the user and at least one metric for each third-party application in the top-n highest performing third-party applications.

8. The one or more non-transitory computer-readable media of claim 1,
wherein the particular feature provides functionality for performing at least one of campaign analytics or forecasting;
wherein the sub-feature is a particular task within a feature hierarchy associated with campaign analytics or forecasting.

9. A system comprising:
one or more hardware processors:
one or more non-transitory computer-readable media comprising instructions which, when executed by the one or more hardware processors, causes performance of operations comprising:
detecting that a user is accessing a particular feature, of a first application, wherein the particular feature is associated with a set of feature data that identifies a function performed by the particular feature of the first application;
determining, based on the set of feature data, that a second application is configured for operations that extend the function performed by the particular feature of the first application;
responsive at least to determining that the second application is configured for operations that extend the function performed by the particular feature of the first application and detecting that the user is accessing the particular feature to perform the function presenting, via an interface of the first application, the second application to the user when the user is accessing the particular feature of the first application;
receiving a user input that drills down to a sub-feature of the particular feature, wherein context data is configured to identify the particular feature as a parent feature of the sub-feature that the user is currently accessing;
responsive to the second user input that drills down to the sub-feature of the particular feature, updating the interface of the first application to present at least a third application that is more relevant to the sub-feature than the second application initially presented to the user;
receiving, through the interface of the first application, user input that selects the third application; and
responsive to receiving, through the interface of the first application, the user input, performing one of installing or triggering execution of the third application to perform at least one operation that extends the function performed by the particular feature of the first application, wherein the at least one operation accesses one or more data objects that are shared with the particular feature and exposed through an application programming interface for the particular feature of the first application, wherein the at least one operation performs one or more additional functions on the one or more data objects that are shared with the particular feature of the first application to enhance the function performed by the particular feature.

10. The system of claim 9, the operations further comprising:
determining whether the third application has already been installed;
in response to determining that the third application has not been installed, presenting an option to install at least one of a full-version or a trial version of the third application; and
in response to determining that the third application has been installed, presenting a link to open the third application.

11. A method comprising:
detecting that a user is accessing a particular feature, of a first application, wherein the particular feature is associated with a set of feature data that identifies a function performed by the particular feature of the first application;
determining, based on the set of feature data, that a second application is configured for operations that extend the function performed by the particular feature of the first application;
responsive at least to determining that the second application is configured for operations that extend the function performed by the particular feature of the first application and detecting that the user is accessing the particular feature to perform the function, presenting, via an interface of the first application, the second application to the user when the user is accessing the particular feature of the first application;
receiving a user input that drills down to a sub-feature of the particular feature, wherein context data is configured to identify the particular feature as a parent feature of the sub-feature that the user is currently accessing;
responsive to the user input that drills down to the sub-feature of the particular feature, updating the interface of the first application to present at least a third application that is more relevant to the sub-feature than the second application initially presented to the user;
receiving, through the interface of the first application, user input that selects the third application; and responsive to receiving, through the interface of the first application, the user input, performing one of installing or triggering execution of the third application to perform at least one operation that extends the function performed by the particular feature of the first application, wherein the at least one operation accesses one or more data objects that are shared with the particular feature and exposed through an application programming interface for the particular feature of the first application, wherein the at least one operation performs one or more additional functions on the one or more data objects that are shared with the particular feature of the first application to enhance the function performed by the particular feature.

12. The method of claim 11, further comprising:
determining whether the third application has already been installed;
in response to determining that the third application has not been installed, presenting an option to install at least one of a full-version or a trial version of the third application; and
in response to determining that the third application has been installed, presenting a link to open the third application.

13. The method of claim 11, wherein the third application is one of a plurality of third-party applications that is configured to extend the function of the particular feature of the first application, and wherein the method further comprises:
ranking the plurality of third-party applications, based at least in part, on one or more of performance of the third-party applications, popularity of the third-party applications, or relevance of the third-party applications to the user; and
presenting a subset of the third-party applications in an order that is based on said ranking.

14. The method of claim 11, wherein the third application is selected for presentation to the user based, at least in part, on detecting that one or more other users of the first application have installed the third application.

15. The method of claim 11, wherein the third application is an application that has already been installed, the method further comprising:
displaying concurrently with the third application, a fourth application that is configured for operations that extends the function of the particular feature and that has not been installed.

16. The method of claim 11, further comprising detecting that the user has navigated away from the particular feature to a second feature, of the first application, that accesses a data set of a second type, responsive at least to detecting that the user has navigated away from the particular feature to the second feature, of the first application, presenting a fourth application to the user, wherein the fourth application is configured for operations that access data sets of the second type.

17. The method of claim 11, further comprising:
responsive at least to detecting that a user is accessing the particular feature, of the first application:
identifying a plurality of third-party applications that extend the function of the particular feature;
for each respective third-party application of the plurality of third-party application, determining a set of metrics that measures a performance of the third-party application with respect to the particular feature of the first application;
determining the top-n highest performing third-party applications based on the set of metrics; and
presenting, to the user, the top-n highest performing third-party applications to the user and at least one metric for each third-party application in the top-n highest performing third-party applications.

18. The method of claim 11,
wherein the particular feature provides functionality for performing at least one of campaign analytics or forecasting;
wherein the sub-feature is a particular task within a feature hierarchy associated with campaign analytics or forecasting.

* * * * *

UNITED STATES PATENT AND TRADEMARK OFFICE
CERTIFICATE OF CORRECTION

PATENT NO. : 10,379,830 B2
APPLICATION NO. : 15/258401
DATED : August 13, 2019
INVENTOR(S) : Prasad et al.

Page 1 of 1

It is certified that error appears in the above-identified patent and that said Letters Patent is hereby corrected as shown below:

In the Specification

In Column 11, Line 23, delete "parameters')" and insert -- parameters") --, therefor.

In the Claims

In Column 18, Line 5, in Claim 1, delete "function" and insert -- function, --, therefor.

Signed and Sealed this
Fourth Day of August, 2020

Andrei Iancu
*Director of the United States Patent and Trademark Office*